(12) United States Patent
Walthers et al.

(10) Patent No.: US 11,551,105 B2
(45) Date of Patent: Jan. 10, 2023

(54) KNOWLEDGE MANAGEMENT USING MACHINE LEARNING MODEL TRAINED ON INCIDENT-KNOWLEDGE RELATIONSHIP FINGERPRINTS

(71) Applicant: ServiceNow, Inc., Santa Clara, CA (US)

(72) Inventors: Bruce Walthers, San Jose, CA (US); Mukund Ramachandran, Sunnyvale, CA (US); Lingzhu Li, Santa Clara, CA (US); Abhay Kulkarni, Pleasanton, CA (US)

(73) Assignee: ServiceNow, Inc., Santa Clara, CA (US)

( * ) Notice: Subject to any disclaimer, the term of this patent is extended or adjusted under 35 U.S.C. 154(b) by 1301 days.

(21) Appl. No.: 15/958,228

(22) Filed: Apr. 20, 2018

(65) Prior Publication Data

US 2019/0325323 A1    Oct. 24, 2019

(51) Int. Cl.
| | |
|---|---|
| *G06N 5/02* | (2006.01) |
| *H04L 41/5061* | (2022.01) |
| *G06N 7/00* | (2006.01) |
| *G06N 20/00* | (2019.01) |

(52) U.S. Cl.
CPC ............ *G06N 5/022* (2013.01); *G06N 7/005* (2013.01); *G06N 20/00* (2019.01); *H04L 41/5061* (2013.01)

(58) Field of Classification Search
None
See application file for complete search history.

(56) References Cited

U.S. PATENT DOCUMENTS

| | | |
|---|---|---|
| 6,609,122 B1 | 8/2003 | Ensor |
| 6,804,665 B2 | 10/2004 | Kreulen et al. |
| 6,816,898 B1 | 11/2004 | Scarpelli |

(Continued)

OTHER PUBLICATIONS

Grouping data points with k-means clustering. (Jordan) retrieved from https://www.jeremyjordan.me/grouping-data-points-with-k-means-clustering/ (Year: 2016).*

(Continued)

*Primary Examiner* — Alan Chen
(74) *Attorney, Agent, or Firm* — Fletcher Yoder PC

(57) ABSTRACT

Client instance data including a plurality of incidents and a plurality of knowledge elements comprising information relating to resolving one or more of the plurality of incidents is obtained. A validation set is built based on the obtained client instance data, the validation set including fingerprint data of plural fingerprints of known incident-knowledge relationships, each of fingerprint representing a link between one of the incidents and one of the knowledge elements used for resolving the incident. A knowledge element class is predicted from among plural knowledge element classes for each of knowledge element based on the built validation set, the plural knowledge element classes being defined based on respective threshold values indicating a quality of coverage provided by a knowledge element for resolving an incident. Classification data of the plural knowledge elements classified into the plural knowledge element classes is presented with the obtained client instance data.

20 Claims, 10 Drawing Sheets

(56) References Cited

U.S. PATENT DOCUMENTS

| | | |
|---|---|---|
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter et al. |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 9,065,683 B2 | 6/2015 | Ding |
| 9,122,552 B2 | 9/2015 | Whitney |
| 9,239,857 B2 | 1/2016 | Trinon |
| 9,535,737 B2 | 1/2017 | Joy |
| 9,557,969 B2 | 1/2017 | Sharma |
| 9,792,387 B2 | 10/2017 | George |
| 9,819,729 B2 | 11/2017 | Moon |
| 10,284,587 B1* | 5/2019 | Schlatter ............. H04L 63/1433 |
| 2008/0140495 A1 | 6/2008 | Bhamidipaty et al. |
| 2014/0129536 A1* | 5/2014 | Anand ............... G06Q 10/0635 707/723 |
| 2018/0205751 A1* | 7/2018 | Howie ............... G06F 21/552 |
| 2019/0012609 A1* | 1/2019 | Fishler ............... G06N 20/00 |
| 2019/0149396 A1* | 5/2019 | Zafer ............... H04L 41/0609 709/224 |

OTHER PUBLICATIONS

Essentials of joining tables (ArcMap) retrieved via internet archive on Nov. 22, 2016 from https://web.archive.org/web/20161122074718/ https://desktop.arcgis.com/en/arcmap/10.3/manage-data/tables/essentials-of-joining-tables.htm (Year: 2016).*

Introduction to text representation and similarity (Shulga) retrieved from https://towardsdatascience.com/introduction-to-text-representation-and-similarity-b5dd3fd71737 (Year: 2017).*

Reference Field in ServiceNow Service Portal Widget (Neuralworkz) taken from https://neuralworkz.wordpress.com/2018/02/24/reference-field-in-servicenow-service-portal-widget/ (Year: 2018).*

* cited by examiner

| INCIDENT | ATTACH | INTERMEDIATE ATTACH | INTERMEDIATE KB REF | KB REF | HIGH TEXT SIMILARITY | MODEL FIT | COVERAGE CONFIDENCE | STATUS |
|---|---|---|---|---|---|---|---|---|
| INCI234 | - | KB45678 | KB45678 | - | KB45678 | 0.67029 | 0.97234 | GOOD COV |
| INCI235 | - | KB85858 | KB85858 | KB82928 | - | 0.71235 | 0.9192 | GOOD COV |
| INCI236 | - | KB68928 | - | - | - | 0.59293 | 0.9202 | GOOD COV |
| INCI237 | - | - | - | KB207205 | - | 0.34857 | 0.78202 | GOOD COV |
| INCI238 | - | - | - | - | KB20726 | 0.50273 | 0.81229 | GOOD COV |
| INCI239 | - | - | - | - | - | 0.49272 | 0.69027 | NEED KB |
| INCI240 | - | - | - | - | - | 0.21827 | 0.49027 | NEED KB |
| INCI241 | - | - | - | - | - | 0.89273 | 0.81028 | GOOD COV |
| INCI242 | KB474759 | - | - | - | - | 0.71203 | 0.92028 | GOOD COV |
| INCI243 | - | KB297277 | KB297277 | KB297277 | KB297277 | 0.59278 | 0.98246 | GOOD COV |

FIG. 7

| KNOWLEDGE ELEMENT | ATTACH | INTERMEDIATE ATTACH | INTERMEDIATE KB REF | # OF INC REF | HIGH TEXT SIMILARITY | IN VALIDATION SET | MODEL FIT | COVERAGE CONFIDENCE | STATUS |
|---|---|---|---|---|---|---|---|---|---|
| KB1234 | - | 1 | 21 | - | 5 | YES | 0.67029 | 0.97234 | GOOD COV |
| KB1235 | - | 1 | 4 | 4 | - | YES | 0.71235 | 0.9192 | GOOD COV |
| KB1236 | - | 3 | - | - | - | NO | 0.59293 | 0.7202 | GOOD COV |
| KB1237 | - | - | - | 1 | - | YES | 0.34857 | 0.78202 | GOOD COV |
| KB1238 | - | - | - | - | 4 | NO | 0.50273 | 0.71229 | GOOD COV |
| KB1239 | - | - | - | - | - | NO | 0.49272 | 0.69027 | REVISE |
| KB1240 | - | - | - | - | - | NO | 0.21827 | 0.24027 | RETIRE |
| KB1241 | 1 | - | - | - | - | NO | 0.89273 | 0.71028 | GOOD COV |
| KB1242 | - | - | - | - | - | YES | 0.71203 | 0.92028 | GOOD COV |
| KB1243 | - | 4 | 3 | 11 | 14 | YES | 0.49027 | 0.98287 | GOOD COV |

*FIG. 8*

KNOWLEDGE MANAGEMENT USING MACHINE LEARNING MODEL TRAINED ON INCIDENT-KNOWLEDGE RELATIONSHIP FINGERPRINTS

TECHNICAL FIELD

Embodiments described herein generally relate to customer support and knowledge management (hardware, software, or cloud-based), and more specifically, to evaluating the overall effectiveness of a knowledge base (KB) of an enterprise relative to its incidents by identifying relationships between the incidents and knowledge elements in the KB.

BACKGROUND

Customer (or technical) support may be provided to a user (e.g., customer, employee, or agent) of an enterprise when the user is experiencing an issue. An enterprise having a relatively large number of users may employ a number of customer support representatives or technicians particularly knowledgeable about various aspects including services, processes, functions, or applications (hardware or software systems) of the enterprise. Customer support may also be provided by the enterprise to help users efficiently use its hardware and software systems, or any of its services, processes, functions, or other aspects. Customer support may be provided by the technicians by resolving incidents (i.e., incident or trouble tickets, help desk tickets, service requests, or incident reports) created by users. Many users may prefer to find an answer themselves rather than contacting customer service or an internal helpdesk. To address this need, the enterprise may provide a self-help portal based on a knowledge management (KM) solution where users may navigate to search for and view content to help them find solutions to issues or questions. The KM solution may provide a platform for creating, sharing, using, improving, and managing a KB (knowledge repository) and information of the enterprise to help the enterprise achieve its organizational objectives. The self-help portal based on the KM solution may be implemented on a self-hosted system or a cloud computing based system of the enterprise.

Cloud computing relates to sharing of computing resources that are generally accessed via the Internet or other wide area network (WAN). In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

In the context of customer support, it is desirable that the issues the users are experiencing may be resolved by content included in the KB. For example, a customer support representative may identify information relevant to the user's issue or question from the KB and provide that information to the user to resolve an incident created by the user. This identified link (or relationship) between a knowledge element of the KB including information relevant to the user's issue and the incident created by the user may be documented by the support technician when resolving the incident. However, the technician may not always formally document this relationship. Since KM (e.g., creating, sharing, using, improving, or managing content in the KB) is resource intensive, it is desirable to identify or predict this relationship between incidents and knowledge elements that may have been used to resolve the incidents to determine the overall effectiveness of the knowledge elements in the KB, determine the number of incidents that may be covered or resolved by content included in the KB, determine the percentage of knowledge elements in the KB that are actually resolving issues for the users, and determine areas where additional KB content is needed but does not exist.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a method includes: obtaining, with one or more processors, client instance data including a plurality of incidents and a plurality of knowledge elements comprising information relating to resolving one or more of the plurality of incidents; building, with the one or more processors, a validation set based on the obtained client instance data, wherein the validation set comprises fingerprint data of a plurality of fingerprints of known incident-knowledge relationships, each of the plurality of fingerprints representing a link between one of the plurality of incidents and one of the plurality of knowledge elements used for resolving the incident; predicting, with the one or more processors, a knowledge element class from among a plurality of knowledge element classes for each of the plurality of knowledge elements based on the built validation set, the plurality of knowledge element classes being defined based on respective threshold values indicating a quality of coverage provided by a knowledge element for resolving an incident; and presenting, with the one or more processors, classification data of the plurality of knowledge elements classified into the plurality of knowledge element classes with the obtained client instance data.

In another embodiment, the method may be embodied in computer executable program code and stored in a non-transitory computer-readable storage medium. In yet another embodiment, the method may be implemented on a computer system.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIG. 7 illustrates artifact 700 showing exemplary data associated with the plurality of incidents in accordance with one or more disclosed embodiments.

FIG. 8 illustrates artifact 800 showing exemplary data associated with the plurality of knowledge elements in accordance with one or more disclosed embodiments.

DESCRIPTION OF EMBODIMENTS

Figure 1:
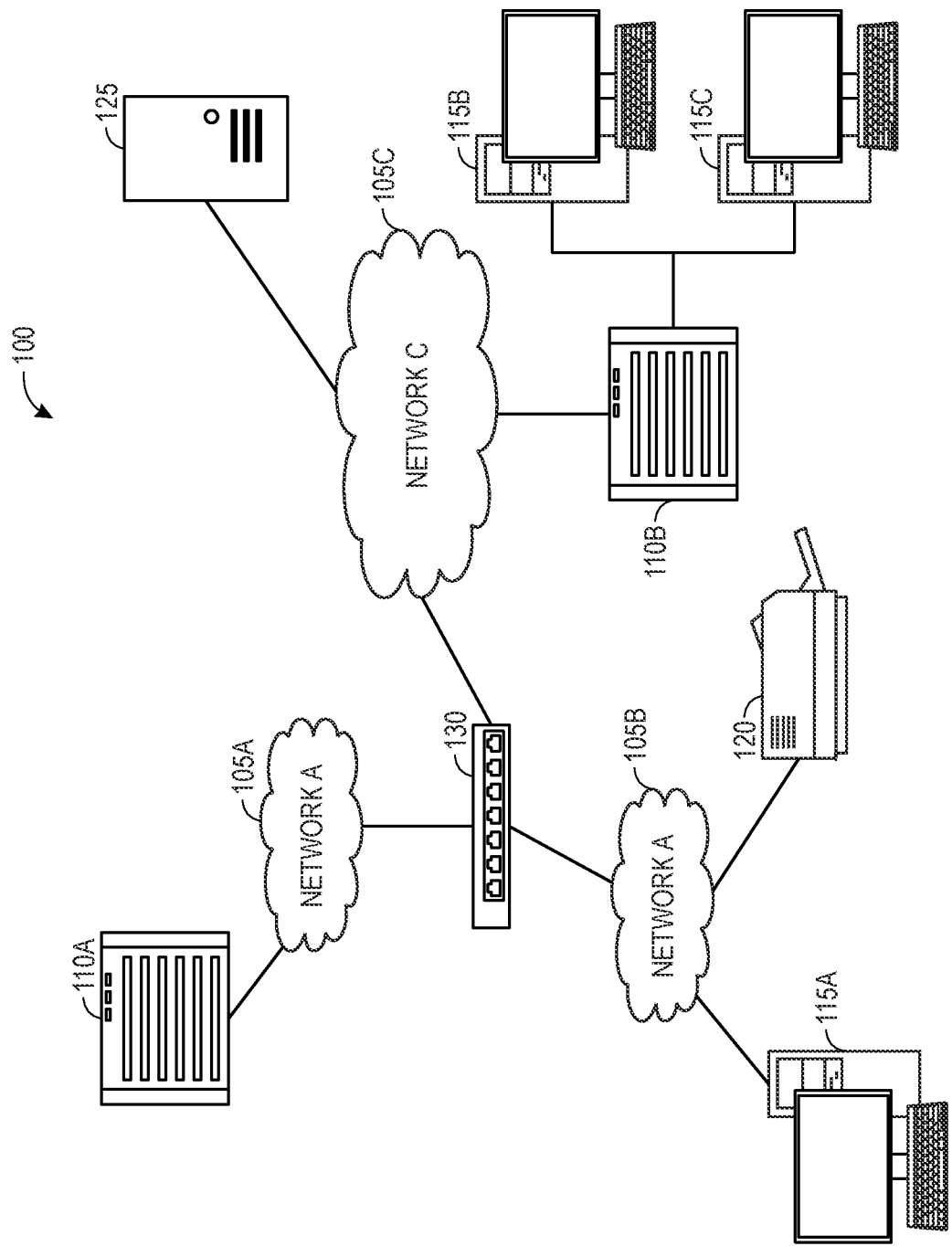
FIG. 1 illustrates a block diagram of self-hosted network system 100 where one or more embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

The disclosure pertains to a solution for evaluating the overall effectiveness of a knowledge base (KB) relative to incidents of an enterprise. Techniques disclosed herein look to identify known relationships between closed incidents (i.e., incidents that have been resolved) and knowledge elements of the KB by looking for fingerprints indicating links between the closed incidents and the knowledge elements. The fingerprints may be of different types including: (i) an attachment fingerprint type where an instance table join shows whether a given knowledge element was formally attached to a given incident directly or via one or more intermediate entities (e.g., problem report, change report, release report, asset report, and the like), (ii) a reference or traversal fingerprint type where a regular expression text search indicates whether reference information of a given knowledge element (e.g., title, file name, ID, link) was included in a predetermined field (e.g., incident resolution description, work notes, close notes, and the like) of the closed incident or included in a predetermined field of one or more intermediate entities; and (iii) a text similarity fingerprint type where a high text similarity exists between a portion of a given knowledge element and a portion of a predetermined field of the closed incident (e.g., a 'copy-and-paste' scenario). The identified fingerprints may form a validation set of known relationships indicating incidents each of which has a high probability of being resolved using one or more knowledge elements from the KB. Thus, the validation set may include a class (or group) of incidents from the total number of incidents that may have 'good coverage' in the KB (i.e., information relating to resolving the incidents may be available in the KB) and conversely, a class (or group) of knowledge elements from the total number of knowledge elements in the KB that have a high probability of providing 'good coverage' (i.e., each knowledge element in the knowledge element class may provide information that was useful for resolving an incident in the incident class). The validation set may also include other classes (or groups) of incidents and/or knowledge elements (e.g., a class of incidents from the total number of incidents that may not be adequately covered by the knowledge elements in the KB and may need additional knowledge in the KB, a class of incidents that may be flagged as 'one-offs', a class of knowledge elements that may not provide adequate coverage to incidents and that may be recommended for making revisions, and a class of knowledge elements that may be recommended for 'retirement').

Based on the validation set, and using machine learning or other artificial intelligence techniques (e.g., supervised machine learning or unsupervised machine learning), additional incidents and/or knowledge elements may be predicted as belonging to one or more of the above identified classes to thereby automatically classify the knowledge elements and/or incidents to measure effectiveness of the knowledge elements in resolving the incidents. The classification data may be presented to the user with client instance data of incidents and knowledge elements for determining further service management operations (e.g., create, update, or retire certain knowledge elements). In one embodiment, topic modelling may be performed on extracted data of historical closed incidents and extracted knowledge elements in the KB to group the extracted data into topics and make topic-specific classifications of the incidents and knowledge elements, thereby measuring topic-specific effectiveness of the knowledge elements and enabling the user to determine (or automatically recommending) further topic-specific service management operations (e.g., topic-specific creation, revision or retirement for knowledge elements, or topic-specific 'need knowledge' indication for incidents).

FIG. 1 depicts an illustrative self-hosted network system 100 where one or more embodiments of the present disclosure may operate. This illustrative network system 100 may include a plurality of networks 105, (i.e., 105A, 105B, and 105C), each of which may take any form including, but not limited to, a local area network (LAN) or a WAN, such as the Internet. Further, networks 105 may use any desired technology (wired, wireless, or a combination thereof) and protocol (e.g., transmission control protocol, TCP). Coupled to networks 105 are data server computers 110 (i.e., 110A and 110B) that are capable of operating server applications such as databases and also capable of communicating over networks 105. One embodiment using server computers may involve the operation of one or more central systems to log user session data and identify session signatures of the user session.

Client computers 115 (i.e., 115A, 115B, and 115C), which may take the form of any smartphone, gaming system, tablet, computer, set top box, entertainment device/system, television, telephone, communications device, or intelligent machine, including embedded systems, may also be coupled to networks 105, and/or data server computers 110. In some embodiments, network system 100 may also include network printers such as printer 120 and storage systems such as 125, which may be used to store user session data or other data that are referenced herein. To facilitate communication between different network devices (e.g., data servers 110, end-user computers 115, network printer 120, and storage system 125), at least one gateway or router 130 may be optionally coupled there between. Furthermore, in order to facilitate such communication, each device employing the network may comprise a network adapter circuit and related software. For example, if an Ethernet network is desired for communication, each participating device must have an Ethernet adapter or embedded Ethernet capable ICs. Further, the devices may carry network adapters for any network in which they might participate (including, but not limited to, personal area networks (PANs), LANs, WANs, and cellular networks).

Figure 2:
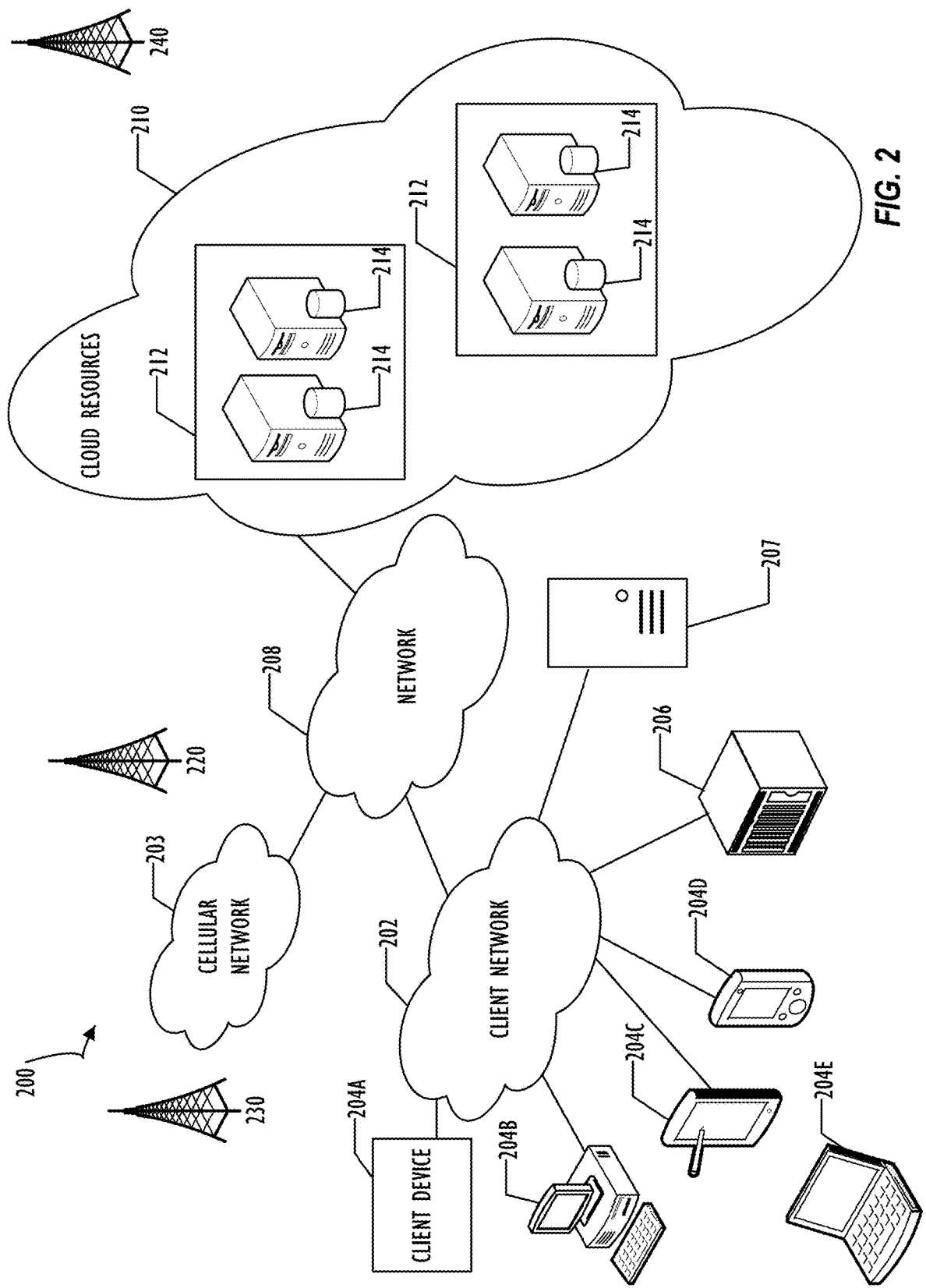
FIG. 2 illustrates a block diagram of cloud computing infrastructure 200 where one or more embodiments of the present disclosure may operate.

FIG. 2 illustrates a block diagram of an embodiment of a cloud computing infrastructure 200 where one or more embodiments of the present disclosure may operate. Cloud computing infrastructure 200 comprises a client network 202, network 208, and a cloud resources platform/network 210. In one embodiment, the client network 202 may be a local private network such as LAN that includes a variety of network devices that include, but are not limited to switches, servers, and routers. Each of these networks can contain wired or wireless programmable devices and operate using any number of network protocols (e.g., TCP/IP) and connection technologies (e.g., Wi-Fi® networks, Bluetooth®). Wi-Fi is a registered trademark of the Wi-Fi Alliance. Bluetooth is a registered trademark of Bluetooth Special Interest Group. In another embodiment, client network 202 represents an enterprise network that could include or be communicatively coupled to one or more local area networks (LANs), virtual networks, data centers and/or other remote networks (e.g., 208, 210). As shown in FIG. 2, client network 202 may be connected to one or more client devices 204A-E and allow the client devices to communicate with each other and/or with cloud resources platform/network 210. Client devices 204A-E may be computing systems such as desktop computer 204B, tablet computer 204C, mobile phone 204D, laptop computer (shown as wireless) 204E, and/or other types of computing systems generically shown as client device 204A. Each of client devices 204A-E may be similar to any of client computers 115 of network system 100 shown in FIG. 1. FIG. 2 also illustrates that client network 202 may be connected to a local compute resource 206 that may include a server, access point, router, or other device configured to provide for local computational resources and/or to facilitate communication amongst networks and devices. For example, local compute resource 206 may be one or more physical local hardware devices configured to communicate with wireless network devices and/or facilitate communication of data between client network 202 and other networks such as network 208 and cloud resources platform/network 210. Local compute resource 206 may also facilitate communication between other external applications, data sources, and services, and client network 202.

FIG. 2 also illustrates that client network 202 may be connected to a computer configured to execute a management, instrumentation, and discovery (MID) server 207. For example, MID server 207 may be a Java® application that runs as a Windows® service or UNIX® daemon. Java is a registered trademark of Oracle America, Inc. Windows is a registered trademark of Microsoft Corporation. UNIX is a registered trademark of The Open Group. MID server 207 may be configured to assist functions such as, but not necessarily limited to, discovery, orchestration, service mapping, service analytics, and event management. MID server 207 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 200 also includes cellular network 203 for use with mobile communication devices. Mobile cellular networks support mobile phones and many other types of mobile devices such as laptops etc. Mobile devices in cloud computing infrastructure 200 are illustrated as mobile phone 204D, laptop 204E, and tablet 204C. A mobile device such as mobile phone 204D may interact with one or more mobile provider networks as the mobile device moves, typically interacting with a plurality of mobile network towers 220, 230, and 240 for connecting to the cellular network 203. Although referred to as a cellular network in FIG. 2, a mobile device may interact with towers of more than one provider network, as well as with multiple non-cellular devices such as wireless access points and routers (e.g., local compute resource 206). In addition, the mobile devices may interact with other mobile devices or with non-mobile devices such as desktop computer 204B and various types of client device 204A for desired services. Although not specifically illustrated in FIG. 2, client network 202 may also include a dedicated network device (e.g., a gateway or router) or a combination of network devices that implement a customer firewall or intrusion protection system.

FIG. 2 illustrates that client network 202 is coupled to a network 208. Network 208 may include one or more computing networks, such as other LANs, wide area networks (WANs), the Internet, and/or other remote networks, in order to transfer data between client devices 204A-E and cloud resources platform/network 210. Each of the computing networks within network 208 may contain wired and/or wireless programmable devices that operate in the electrical and/or optical domain. For example, network 208 may include wireless networks, such as cellular networks in addition to cellular network 203. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 208 may also employ any number of network communication protocols, such as Transmission Control Protocol (TCP) and Internet Protocol (IP). Although not explicitly shown in FIG. 2, network 208 may include a variety of network devices, such as servers, routers, network switches, and/or other network hardware devices configured to transport data over networks.

In FIG. 2, cloud resources platform/network 210 is illustrated as a remote network (e.g., a cloud network) that is able to communicate with client devices 204A-E via client network 202 and network 208. The cloud resources platform/network 210 acts as a platform that provides additional computing resources to the client devices 204A-E and/or client network 202. For example, by utilizing the cloud resources platform/network 210, users of client devices 204A-E may be able to build and execute applications, such as automated processes for various enterprise, IT, field service and/or other organization-related functions. In one embodiment, the cloud resources platform/network 210 includes one or more data centers 212, where each data center 212 could correspond to a different geographic location. Within a particular data center 212 a cloud service provider may include a plurality of server instances 214. Each server instance 214 may be implemented on a physical computing system, such as a single electronic computing device (e.g., a single physical hardware server) or could be in the form of a multi-computing device (e.g., multiple physical hardware servers). Examples of server instances 214 include, but are not limited to, a web server instance (e.g., a unitary Apache® installation), an application server instance (e.g., unitary Java Virtual Machine), and/or a database server instance (e.g., a unitary MySQL® catalog). Apache is a registered trademark of Apache Software Foundation. MySQL is a registered trademark of MySQL AB.

To utilize computing resources within cloud resources platform/network 210, network operators may choose to configure data centers 212 using a variety of computing infrastructures. In one embodiment, one or more of data centers 212 are configured using a multi-tenant cloud architecture such that a single server instance 214, which can also be referred to as an application instance, handles requests and serves more than one customer. In some cases, data centers with multi-tenant cloud architecture commingle and store data from multiple customers, where multiple client instances are assigned to a single server instance 214. In a multi-tenant cloud architecture, the single server instance 214 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 214 causing outages for all customers allocated to the single server instance 214.

In another embodiment, one or more of the data centers 212 are configured using a multi-instance cloud architecture to provide every customer its own unique client instance. For example, a multi-instance cloud architecture could provide each client instance with its own dedicated application server and dedicated database server. In other examples, the multi-instance cloud architecture could deploy a single server instance 214 and/or other combinations of server instances 214, such as one or more dedicated web server instances, one or more dedicated application server instances, and one or more database server instances, for each client instance. In a multi-instance cloud architecture, multiple client instances could be installed on a single physical hardware server where each client instance is allocated certain portions of the physical server resources, such as computing memory, storage, and processing power. By doing so, each client instance has its own unique software stack that provides the benefit of data isolation, relatively less downtime for customers to access the cloud resources platform/network 210, and customer-driven upgrade schedules. An example of implementing a client instance within a multi-instance cloud architecture will be discussed in more detail below when describing FIG. 3.

Figure 3:
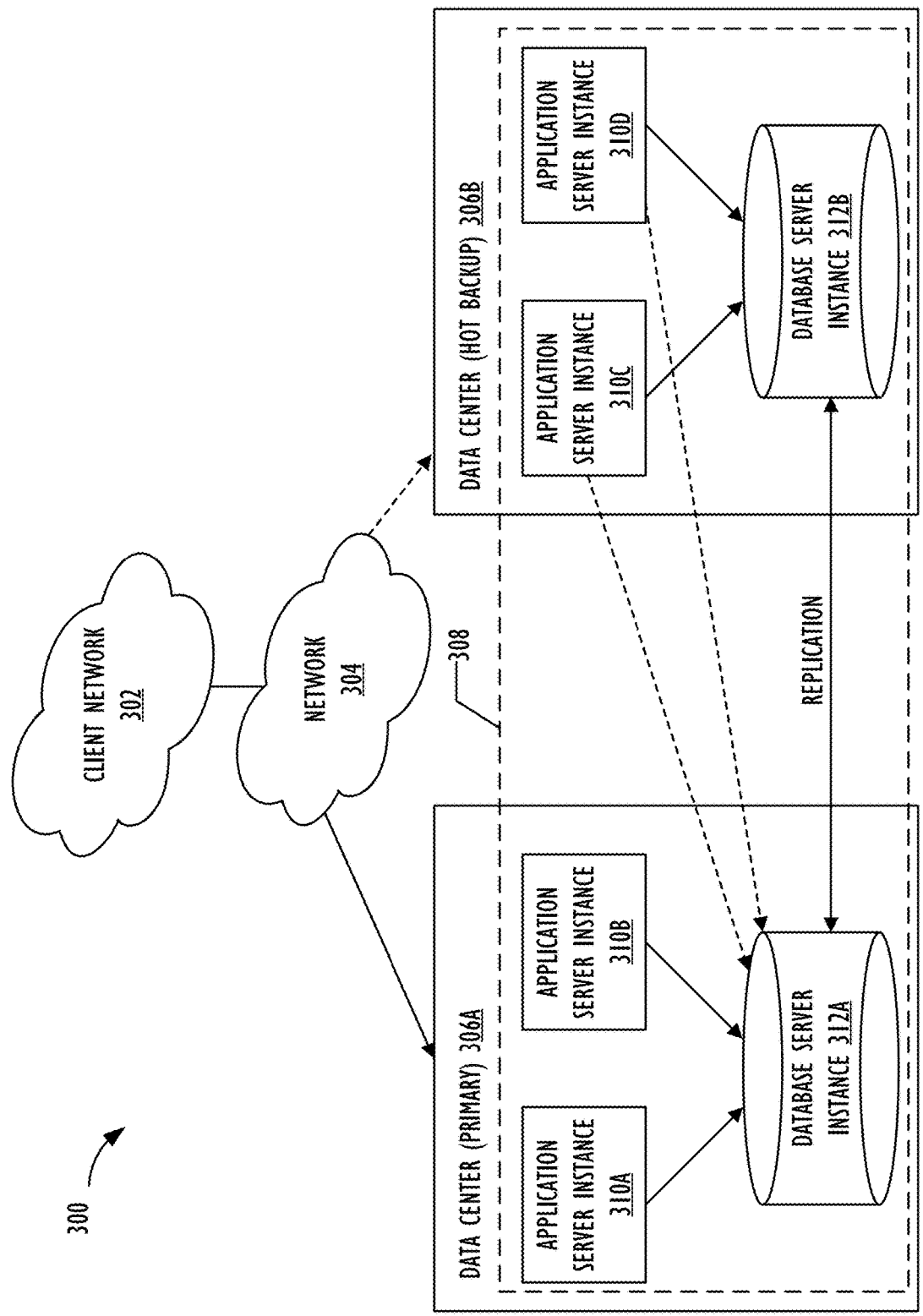
FIG. 3 illustrates a block diagram of multi-instance cloud architecture 300 where one or more embodiments of the present disclosure may operate.

In one embodiment, utilizing a multi-instance cloud architecture, a first client instance may be configured with a client side application interface such as, for example, a web browser executing on a client device (e.g., one of client devices 204A-E of FIG. 2). FIG. 3 illustrates a block diagram of an embodiment of a multi-instance cloud architecture 300 where embodiments of the present disclosure may operate. FIG. 3 illustrates that the multi-instance cloud architecture 300 includes a client network 302 that connects to two data centers 306A and 306B via network 304. Client network 302 and network 304 may be substantially similar to client network 302 and network 208 as described in FIG. 2, respectively. Data centers 306A and 306B can correspond to FIG. 2's data centers 212 located within cloud resources platform/network 210. Using FIG. 3 as an example, a client instance 308 is composed of four dedicated application server instances 310A-310D and two dedicated database server instances 312A and 312B. Stated another way, the application server instances 310A-310D and database server instances 312A and 312B are not shared with other client instances 308. Other embodiments of multi-instance cloud architecture 300 could include other types of dedicated server instances, such as a web server instance. For example, client instance 308 could include the four dedicated application server instances 310A-310D, two dedicated database server instances 312A and 312B, and four dedicated web server instances (not shown in FIG. 3).

To facilitate higher availability of client instance 308, application server instances 310A-310D and database server instances 312A and 312B are shown to be allocated to two different data centers 306A and 306B, where one of data centers 306 may act as a backup data center. In reference to FIG. 3, data center 306A acts as a primary data center that includes a primary pair of application server instances 310A and 310B and primary database server instance 312A for client instance 308, and data center 306B acts as a secondary data center to back up primary data center 306A for client instance 308. To back up primary data center 306A for client instance 308, secondary data center 306B includes a secondary pair of application server instances 310C and 310D and a secondary database server instance 312B. Primary database server instance 312A is able to replicate data to secondary database server instance 312B. As shown in FIG. 3, primary database server instance 312A replicates data to secondary database server instance 312B using a replication operation such as, for example, a Master-Master MySQL Binlog replication operation. The replication of data between data centers could be implemented in real time or by implementing full backup weekly and daily incremental backups in both data centers 306A and 306B. Having both a primary data center 306A and secondary data center 306B allows data traffic that typically travels to the primary data center 306A for client instance 308 to be diverted to secondary data center 306B during a failure and/or maintenance scenario. Using FIG. 3 as an example, if application server instances 310A and 310B and/or primary data server instance 312A fail and/or are under maintenance, data traffic for client instance 308 can be diverted to secondary application server instances 310C and 310D and secondary database server instance 312B for processing.

Although FIGS. 2 and 3 illustrate specific embodiments of cloud computing system 200 and multi-instance cloud architecture 300, respectively, the disclosure is not limited to the specific embodiments illustrated in FIGS. 2 and 3. For instance, although FIG. 2 illustrates that cloud resources platform/network 210 is implemented using data centers, other embodiments of the cloud resources platform/network 210 are not limited to data centers and can utilize other types of remote network infrastructures. Moreover, other embodiments of the present disclosure may combine one or more different server instances into a single server instance. Using FIG. 3 as an example, application server instances 310 and database server instances 312 can be combined into a single server instance. The use and discussion of FIGS. 1-3 are only exemplary to facilitate ease of description and explanation.

Figure 4:
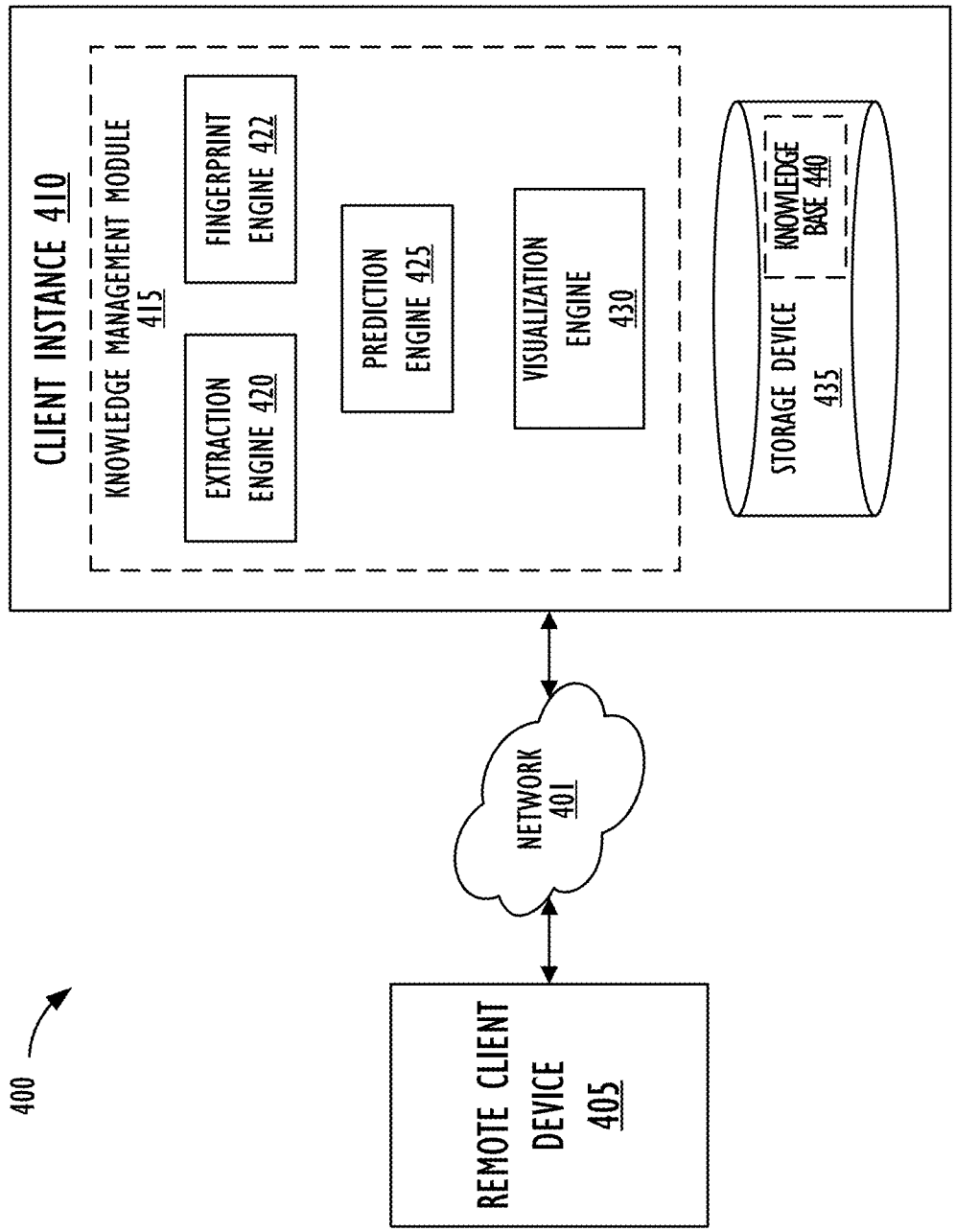
FIG. 4 illustrates a block diagram of knowledge management (KM) system 400 where one or more embodiments of the present disclosure may operate.

FIG. 4 illustrates a block diagram of knowledge management (KM) system 400 where one or more embodiments of the present disclosure may operate. As shown in FIG. 4, KM system 400 may include remote client device 405 and client instance 410 that are communicatively coupled to each other through network 401. Remote client device 405 may be substantially similar to any of client computers 115, as described in FIG. 1, and client devices 204A-E, as described in FIG. 2. Network 401 may be substantially similar to any of networks 105, as described in FIG. 1, and client network 202 and network 208, as described in FIG. 2. Detailed description of remote client device 405 and network 401 is omitted here. Client instance 410 may be substantially similar to client instance 308, as described in FIG. 3. Client instance 410 may be hosted on any of data server computers 110, as described in FIG. 1, and cloud resources platform/network 210, as described in FIG. 2, and may be accessible by a user of remote client device 405 via network 401 through an application interface such as, for example, a graphical user interface (GUI) or a web browser executing on remote client device 405, in order to access software applications and services deployed on client instance 410. Client instance 410 may include KM module 415 and storage device 435 that is communicatively coupled with KM module 415.

KM module 415 may include extraction engine 420, fingerprint engine 422, prediction engine 425, and visualization engine 430. Storage device 435 may be a relational database storing proprietary data associated with client instance 410. Storage device 435 may include KB 440. In one embodiment, storage device 435 may store incident management data, problem management data, change management data, release management data, HR management data and the like. Incident Management may enable restoration of normal service operation as quickly as possible, while minimizing impact to enterprise operations and ensuring quality is maintained. Incident management may include logging incidents in client instance 410 or by sending email, classifying incidents by impact and urgency to prioritize work, assigning to appropriate groups for quick resolution, escalating as necessary for further investigation, resolving the incident and notifying the user who logged it, using reports to monitor, track, and analyze service levels and improvement. Incident management data may include data from one or more incident management tables on storage device 435 (e.g., data associated with incident or trouble tickets, incident reports, email requests, service requests, walk-in IT helpdesk requests, helpdesk tickets, and the like).

Problem management may help identify the root cause of an error in IT infrastructure, reported as occurrences of one or more related incidents. Resolving a problem may mean fixing the error that will stop these incidents from occurring in the future. Problem management data may include data from one or more problem management tables on storage device 435 (e.g., data associated with problem tickets, problem reports, and the like). Change management may provide a systematic approach to control the life cycle of all changes, facilitating beneficial changes to be made with minimum disruption to IT services. Change management data may include data from one or more change management tables on storage device 435 (e.g., data associated with change tickets, change reports, and the like). Release management may encompasses the planning, design, build, configuration, and testing of hardware and software releases to create a defined set of release components. Release Management may handle releases using a task record system. Release management data may include data from one or more release management tables on storage device 435 (e.g., data associated with release tickets, release reports, task record system, and the like).

KB 440 may store knowledge element data associated with KM module 415. KM module 415 may enable sharing of information in KB 440 to resolve incidents or issues or questions of users. In particular, KB 440 may contain a plurality of knowledge elements that provide users with information such as self-help, troubleshooting, and task resolution. KM module 415 may support processes for creating, categorizing, reviewing, and approving the knowledge elements. Users may search and browse knowledge elements as well as provide feedback. A knowledge element may be any type of information item (prebuilt documentation) that may be used for resolving an incident and that is included in KB 440. For example, a knowledge element may be a KB article, community forum post, service catalog, documentation, blog post, wiki, audio file, video file, and the like.

Extraction engine 420 may extract data from storage device 435. The extracted data may include historical data of incidents that have been previously closed and that have gone through the entire incident management life cycle. Further, the data may include the knowledge element data of the plurality of knowledge elements from KB 440. The data may further include intermediate entity data that may be used to, for example, identify an incident-knowledge relationship. Intermediate entity data may include problem management data, change management data, release management data, benchmarks data, asset management data, feedback data, and the like. The extracted incident data and knowledge element data may be specific to the client instance 410. Since frequency and types of incidents may be different for each client instance 410, and since the knowledge element data in KB 440 may be unique to each client instance 410, by extracting data particular to client instance 410, measurement of effectiveness of knowledge elements included in KB 440 by KM module 415 may be personalized for client instance 410.

Incidents (and corresponding reports) may be created to address an issue a user of client instance 410 is experiencing. The incident may be created to solve the issue, find information, find an answer to a question, solve a problem, and the like. For example, incidents may include incident tickets or trouble tickets, help desk tickets, email requests, service requests, incident reports, problem tickets or reports, change tickets or reports, release tickets or reports, asset tickets or reports, search queries on a self-help portal, search queries to a chat bot, mobile walk-up IT service request, and the like. One common way for a user to provide an incident report is for the user to complete a web based form describing the complaint/issue. In general, web based forms may have a plurality of fields with some fields (e.g., incident short description, incident solution description, work notes, foot notes, close notes, and the like) being completed in natural language (e.g., free flow text in the user's own words) and others being selected from a pre-determined set of applicable values. Further, incident reports typically have multiple attributes that may be used to facilitate processing (e.g., corrective action) of the incident report. Incident reports may include data from one or more of the incident management tables, problem management tables, change management tables, release management tables, HR management tables, and the like.

Fingerprint engine 422 may extracted data of incidents and knowledge elements of KB 440 to build a validation set including a plurality of fingerprints of known incident-knowledge relationships, each fingerprint representing a link between one of the plurality of incidents and one of the plurality of knowledge elements used for resolving the incident. Prediction engine 425 may predict a knowledge element class from plural knowledge element classes for each knowledge element of KB 440 extracted by extraction engine 420, and predict an incident class from plural incident classes for each incident extracted by extraction engine 420. Prediction engine 425 may utilize machine learning to predict the incident and knowledge element classes and thus automatically assess the overall effectiveness of content in KB 440. Detailed description of the functionality of fingerprint engine 422 and prediction engine 425 is provided in detail with reference to FIGS. 5-9.

Visualization engine 430 may include logic for visualizing data for presentation to the user. For example, visualization engine 430 may visualize classification data of the plurality of knowledge elements classified into the plurality of knowledge element classes and classification data of the plurality of incidents classified into the plurality of incident classes to a user with client instance 410 data. As another example, visualization engine 430 may visualize topic modelling data of a plurality of topics (plurality of common groups) into which the plurality of incidents and knowledge elements may be divided for unsupervised machine learning. Visualization engine 430 may use a variety of visualizations including dashboards, scorecards, widgets and other visualizations. Visualization engine 430 may include logic to visualize KM module 415 at the front end. For example, visualization engine 430 may include logic to visualize indicators, scorecards, dashboards, workbenches, and/or widgets on client device 405.

Figure 5:
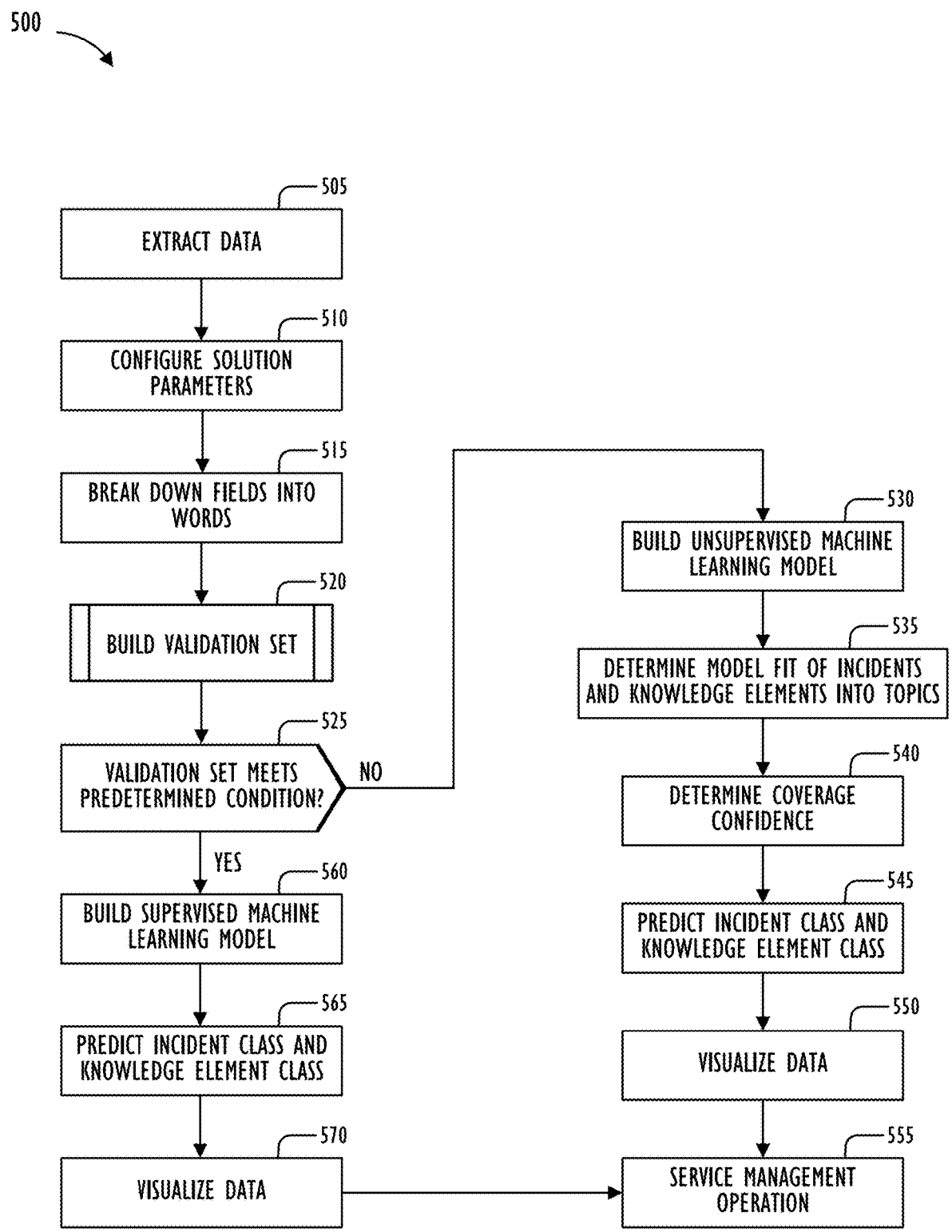
FIG. 5 shows flowchart 500 illustrating operations of KM module 415 of FIG. 4 for predicting incident class and knowledge element class in accordance with one or more disclosed embodiments.

FIG. 5 shows flowchart 500 illustrating operations of KM module 415 of FIG. 4 for predicting incident class and knowledge element class in accordance with one or more disclosed embodiments. Flowchart 500 begins at block 505 with extraction engine 420 extracting data from storage device 435. The extracted data may include incident data of closed incidents, knowledge element data from KB 440, and intermediate entity data including problem management data, change management data, release management data, feedback data and the like. The extracted data may be limited to a particular client instance 410, a particular time period, and selected for only completed incident reports so the data may represent a high degree of accuracy. In one embodiment, an entire dataset client instance 410 (e.g., all closed incidents and all knowledge elements in KB 440) may be extracted. In another embodiment, if the dataset is relatively large (e.g., more than 50,000 rows), only a stratified sampling representing an even sampling of the data may be extracted for classification and KB 440 content effectiveness measurement. The data may be extracted directly out of client instance 410 or may be offline data obtained in the form of a spreadsheet or a comma-separated values (CSV) file. In another embodiment, client instance 410 that has opted in to use the functionality provided by KM module 415 may send its incident data and KB 440 data to a secure storage where a computing system may act upon the data to perform the classification and effectiveness measurement operation and provide results to client instance 410. The data may then be deleted from the secure storage. In one embodiment, the intermediate entity data may help identify incident-knowledge relationships (fingerprints) that are not otherwise directly identifiable. For example, an incident may refer to a problem or change, and the problem or change may in turn refer to a knowledge element that contains information that was used for resolving the (root cause) problem or change.

At block 510, fingerprint engine 422 may select a reference entity and one or more reference fields, and a target entity and one or more target fields from the data extracted at block 505 to identify the fingerprints (i.e., incident-knowledge relationships) in the extracted data at block 505. Fingerprint engine 422 may further select an intermediate entity and one or more intermediate fields to identify additional relationships between reference and target entities. Reference entity may be the extracted historical incident data of client instance 410 and the one or more reference fields may be any text based fields completed in natural language (e.g., free flow text in the user's own words, or helpdesk technician's resolution details) and included in each of the extracted incident reports. For example, the reference fields may be an incident short description text field in which the incident is described in the user's own words, a resolution details text field describing an incident report's resolution details, a work notes or close notes text field, or another field created or renamed to store a solution description of the incident report. Target entity may be the extracted knowledge elements of KB 440 and the one or more target fields may be any text based fields completed in natural language (e.g., free flow text of a knowledge article, audio/video metadata) and included in each extracted knowledge element. For example, the target fields may be a knowledge element title field, knowledge element main text body field, metadata, and the like. Intermediate entity may be the extracted problem management data, change management data, release management data, feedback data, and the like. One or more intermediate fields (e.g., first and second predetermined fields) may include (structured or unstructured) text based fields like problem description, change description, problem/change resolution description, work notes, close notes, and the like. In one embodiment, fingerprint engine 422 may concatenate multiple reference fields to create one reference field, concatenate multiple target fields to create one target field, concatenate multiple intermediate fields to create one intermediate field, and use the concatenated reference and target (and intermediate) fields for identifying fingerprints.

At block 515, fingerprint engine 422 may perform on the fields configured at block 510, data pre-processing including ignoring numbers or punctuation, junk characters, setting stopwords, ignoring frequent words occurring in more than a predetermined percentage of the incident reports or knowledge elements, ignoring infrequent words occurring in less than a predetermined percentage or number of the incident reports or knowledge elements, and setting an Ngram range of words to be considered as one contiguous sequence. For example, a low range and a high range of the Ngram may be set so that each word may be treated independently or a grouping of two or more words may be treated as a group for determining text similarity between the incident reports and knowledge elements (and for performing topic modelling on the incident and knowledge element data). The data pre-processing may further include functions to improve consistency of data or create composite information. In one example, there may be fields that refer to "e-mail" while other records refer to "email." Changing all records to be consistent and removal of extra non-meaningful characters may increase the ability to form matches across the reference and target (and intermediate) fields (and for topic modelling). In addition, at block 515, fingerprint engine 422 may select text in the fields (e.g., reference fields, target fields, and intermediate fields) configured at block 510 and break down the text into single words or two or more words to be considered as one contiguous sequence. The broken down words of the reference and target fields (and intermediate field(s)) may be compared across rows of the extracted fields to determine word similarity, and identify incident-knowledge relationships (or during topic modelling). In one embodiment, at block 515, the extracted text data in the fields (e.g., reference fields, target fields, and intermediate fields) may be tokenized into a term frequency-inverse document frequency (TFIDF) type model to create vectors of words and phrases of the respective fields. Thus, in order to compare the reference field data (i.e., incidents) to target field data (i.e., knowledge elements), vectors of phrases and words of the reference field may be compared to vectors of the target field.

Figure 6:
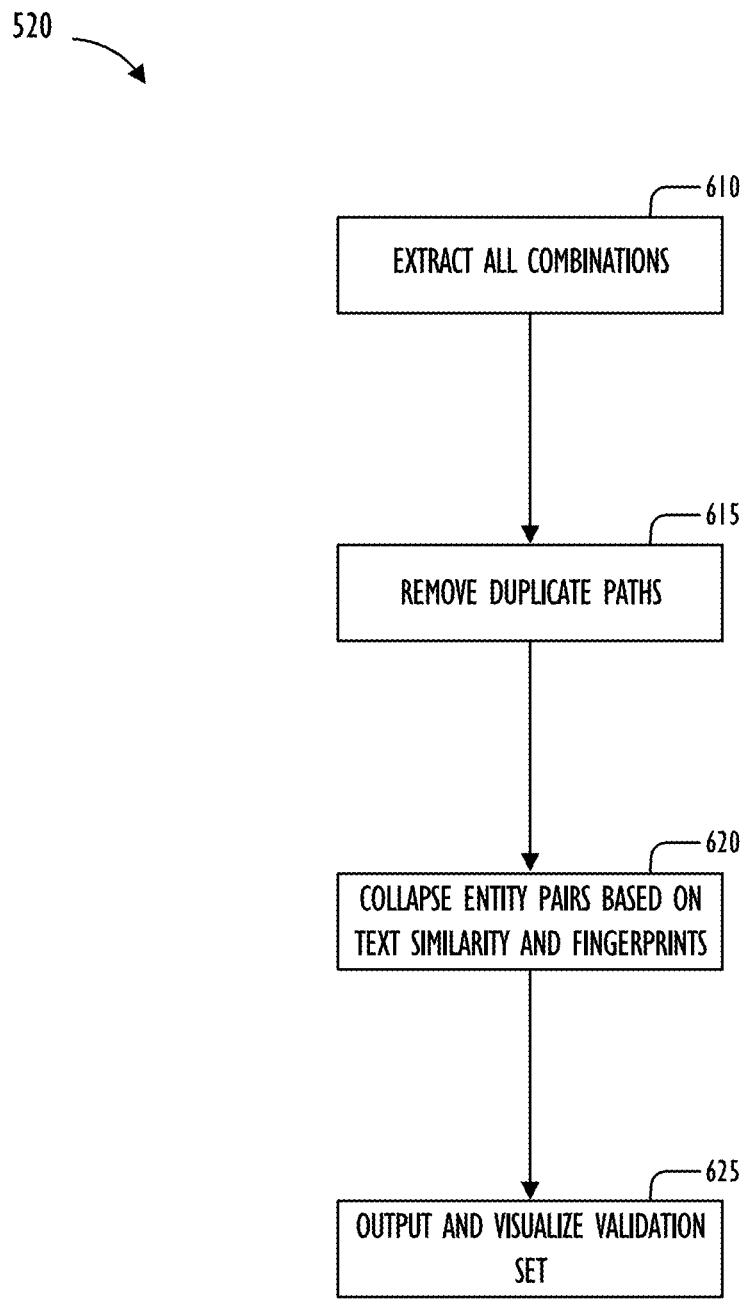
FIG. 6 shows flowchart 600 illustrating operations of block 520 of flowchart 500 of FIG. 5 for building a validation set in accordance with one or more disclosed embodiments.

At block 520, fingerprint engine 422 may build a validation set including identified fingerprints of known incident-knowledge relationships based on the data generated at block 515. Details of operations performed at block 520 are described in detail in connection with flowchart 520 of FIG. 6. FIG. 6 shows flowchart 520 illustrating detailed operations at block 520 of FIG. 5 for building a validation set in accordance with one or more disclosed embodiments. Flowchart 520 begins at block 610 with fingerprint engine 422 extracting all possible combinations of reference entities and target entities (and intermediate entities) using the data extracted at block 505 and further identified and tokenized at blocks 510 and 515, respectively. In one embodiment, fingerprint engine 422 may look for clues or fingerprints in the data to identify known incident-knowledge relationships to build the validation set. Exemplary types of fingerprints that fingerprint engine 422 may be configured to look for (and add corresponding combinations to the validation set) may include an attachment fingerprint type, a text similarity fingerprint type, and a reference fingerprint type. Attachment fingerprint type may refer to a formal relationship between an incident and a knowledge element that was documented by the helpdesk technician when resolving the incident. For example, the technician may have identified a particular knowledge element that includes information useful for resolving the issue (underlying the incident) the user is experiencing. The technician may document this identification by 'attaching' the knowledge element to the incident by entering reference information (e.g., KB element number) of the knowledge element in a predetermined field of the web based form of the incident report, resulting in a table-level join of the knowledge element and the incident on the database at the back end. Attachment fingerprint type may also include a fingerprint based on an intermediate field that indicates the existence of a documented formal relationship when, for example, a technician may identify a problem or change underlying multiple incidents and further identify one or more knowledge elements that include information that is useful for resolving the identified problem or change. The technician may formally document this identification in a predetermined field of the problem or change record to identify a formal relationship between the problem or change record and the one or more knowledge elements. This may result in table-level joins between incidents related to the problem or change record and the identified one or more knowledge elements.

A reference fingerprint type may refer to an incident-knowledge relationship as gleaned from textual search for reference information in the reference and target (and intermediate) text field data. For example, when resolving the incident, the technician may include reference information (e.g., file name, link, title, ID number, and the like) of an identified knowledge element from KB 440 in the reference field (e.g., resolution description, work notes, close notes). Fingerprint engine 422 may search text of the reference field to detect presence of such reference information and identify (and add to the validation set) an incident-knowledge link based on the reference information. The reference fingerprint type may also be identified via an intermediate field when, for example, the technician resolving a problem or change issue (intermediate entity) may document one or more knowledge elements identified as containing information helpful for resolving the problem or change issue by including the reference information (e.g., knowledge element ID) of the knowledge elements in an intermediate field (e.g., problem description, change description, problem/change resolution, and the like). Fingerprint engine 422 may then search for or identify incidents related to the problem or change record and identify one or more incident-knowledge relationships based on the intermediate reference information. Fingerprint engine 422 may also identify reference information of incidents in metadata associated with knowledge elements to thereby detect incident-knowledge relationship of the reference fingerprint type.

A text similarity fingerprint type may refer to an incident-knowledge relationship as gleaned from text similarity between the reference and target (and intermediate) text field data. For example, when resolving the incident, the technician may 'copy-and-paste' into the reference field, text from one or more knowledge elements identified as including information that is useful for resolving the incident. Fingerprint engine 422 may identify this 'copy-and-paste' text included in the reference field as belonging to the corresponding knowledge element using a similarity algorithm and document this incident-knowledge relationship as part of the validation set. In one embodiment, vectors of words and phrases of the reference and target fields may be compared to determine text similarity based on known techniques to identify incident-knowledge links of the text similarity fingerprint type. Fingerprint engine 422 may also identify text similarity based incident-knowledge links in an intermediate traversal scenario where, for example, a technician 'copy-and-pastes' text from a first intermediate field (e.g., problem or change description) into one or more incidents and another technician 'copy-and-pastes' text from one or more knowledge elements identified as containing information that is helpful for resolving the intermediate problem or change into a second intermediate field (e.g., problem or change resolution description, problem or change close notes). The fingerprint types are exemplary and fingerprint engine may detect additional fingerprint types indicating incident-knowledge relationships.

At block 615, fingerprint engine 422 may remove duplicate paths from the combinations (fingerprints or incident-knowledge links) extracted at block 610. At block 610, the same combination of an incident and knowledge element may be identified multiple times based on existence of multiple different fingerprints associated with the same incident and same knowledge element. For example, one or more attachment type fingerprints may identify an incident-knowledge link. Further, one or more reference type fingerprints and one or more text similarity type fingerprints (via intermediate entity or direct) may also identify the same incident-knowledge relationship. At block 615, these duplicate links between the same incident and knowledge element pair may be collapsed into a single incident-knowledge link for entry into the validation set.

At block 620, entity pairs included in the validation set may be further consolidated to enforce predetermined allowable entity relationships. In one embodiment, the allowable entity relationships may be a one-to-one relationship between the reference and target entity. That is, for each incident in the validation set, fingerprint engine 422 may identify only one knowledge element as containing information useful for resolving that incident. Conversely, the allowable entity relationship between the target entity and the reference entity may be a one-to-many relationship. That is, for each knowledge element in the validation set, fingerprint engine 422 may identify one or more incidents as incidents that were resolved using the information contained in the corresponding knowledge element. Thus, at block 620, when multiple fingerprints exist in the validation set where the same incident is identified as having a relationship with two or more knowledge elements, one knowledge element may be selected from among the two or more knowledge elements based on predetermined conditions. For example, fingerprint engine 422 may choose a similarity metric and choose a single target entity (knowledge element) by evaluating text in the reference field against text in target fields of the two or more target knowledge elements and selecting as an entity pair for inclusion in the validation set, one of the two or more knowledge elements which has a higher text similarity to the incident. Fingerprint engine 422 may also 'break the tie' between multiple knowledge elements associated with the same incident based on other methods including determining, for the incident, the number of fingerprints associated with each knowledge element and selecting the knowledge element with the higher number of fingerprints.

At block 625, fingerprint engine 422 may output the built validation set that will be used by prediction engine 425 for further operation and data classification. At block 625, visualization engine 430 may also visualize data of the validation set to present, for example, artifacts 700 and 800 shown in FIGS. 7-8 showing data associated with the plurality of incidents and knowledge elements, respectively.

Returning to FIG. 5, after the validation set building process at block 520, prediction engine 425 may perform operations based on the validation set and using machine learning or other artificial intelligence techniques to identify additional incident-knowledge relationships (or lack thereof) to measure effectiveness of KB 440 by predicting knowledge element classes for the plurality of knowledge elements of KB 440 and predicting incident classes for the plurality of incidents of client instance 410. The plurality of incident classes that may be predicted/known for each incident may include two or more classes and may indicate respective predetermined threshold values representing coverage quality. For example, the plurality of incident classes may include an incident class for incidents, from among the total number of incidents extracted at block 505, that are known to have good coverage (high threshold value) in knowledge elements in KB 440 or that have a high probability of having good coverage based on the prediction by prediction engine 425; incident class for incidents, from among the total number of incidents extracted at block 505, that are known as needing additional knowledge elements in KB 440 (medium threshold value) or that have a high probability of needing additional knowledge based on the prediction by prediction engine 425; and incident class for incidents, from among the total number of incidents extracted at block 505, that are known as being 'one-off' incidents that need not be represented by knowledge elements in KB 440 (low threshold value) or that have a high probability of being 'one-offs' based on the prediction by prediction engine 425.

The plurality of knowledge element classes that may be predicted/known for each knowledge element may include two or more classes. For example, the plurality of knowledge element classes may include a knowledge element class for knowledge elements, from among the total number of knowledge elements extracted at block 505, that are known to provide good coverage (high threshold value) to incidents or that have a high probability of providing good coverage based on the prediction by prediction engine 425; a knowledge element class for knowledge elements, from among the total number of knowledge elements extracted at block 505, that are known as needing revision in order to provide good coverage to incidents (medium threshold value) or that have a high probability that revision is needed based on the prediction by prediction engine 425; and a knowledge element class for knowledge elements, from among the total number of knowledge elements extracted at block 505, that are recommended for retirement (low threshold value) based on the prediction by prediction engine 425 of there being a high probability that they do not provide coverage for any incident extracted at block 505.

Prediction engine 425 may perform the classification of the overall data by predicting additional incident-knowledge relationships between incidents and knowledge elements when there is a high probability that information provided by a particular knowledge element was used or could have been used to resolve an particular incident (or group of incidents), predicting incidents for which more knowledge is needed in KB 440, predicting knowledge elements that can be recommended for revision or retirement, and the like. To perform the predictions, prediction engine 425 may use machine learning, deep learning or other artificial intelligence based algorithms. The algorithm may be a supervised, unsupervised or reinforcement machine learning algorithm depending on the characteristics of data included in validation set. Examples of machine learning algorithms that may be used by prediction engine 425 may include a naïve Bayes Classifier Algorithm, K Means Clustering Algorithm, Support Vector Machine Algorithm, Linear Regression, Logistic Regression, any kind of Neural Network, Random Forests, Decision Trees, Nearest Neighbors, or Gaussian process. The algorithm to be used by prediction engine 425 may depend on the 'signal' that can be extracted from the data in the validation set built at block 520. For example, if fingerprint engine 422 is able to build a large validation set which includes enough training data where each incident class and knowledge element class is adequately represented (e.g., 2000-4000 samples for each incident and knowledge element class), prediction engine 425 may determine that the validation set meets predetermined conditions (YES at block 525), and operation proceeds to block 560, where prediction engine 425 may build a supervised machine learning model based on training data (training set) derived from the validation set. On the other hand, if prediction engine 425 determines that there is not enough training data in the validation set to build a supervised machine learning model, prediction engine 425 may determine that the validation set does not meet the predetermined conditions (NO at block 525), and operation proceeds to block 530.

At block 530, prediction engine 425 may be trained to perform predictions by building an unsupervised machine learning model and use the fingerprints in the validation set to validate the unsupervised machine learning model 'after the fact'. In one embodiment, prediction engine 425 may be trained using non-negative matrix factorization based topic modelling for building the unsupervised machine learning model. At block 530, since there is not enough 'signal' in the data of the validation set, prediction engine 425 does not feed the validation set data to build the unsupervised machine learning model. Rather, to build the unsupervised model, prediction engine 425 may perform topic modelling on a stream of data of the plurality of incidents and knowledge elements of KB 440 extracted at block 505 and further processed at blocks 510 and 515 to create a plurality of topics (common groupings) based on text similarity determinations made by an overall topic modelling framework. In one embodiment, a dictionary created based on the broken down reference and target fields at block 515 and model parameters of topic modelling may be used to create the topics and project the plurality of incidents and knowledge elements onto the created plurality of topics. Prediction engine 425 may thus create a set of topics that fully represent the stream of data including the plurality of incidents and knowledge elements. Prediction engine 425 may assign the same topic to both an incident and a knowledge element from the stream of data. In one embodiment, prediction engine 425 may enable a user to iterate the unsupervised model until a predetermined threshold level of accuracy is achieved on the incident-knowledge pairs included in the validation set.

For example, prediction engine 425 enable the user to iterate the unsupervised model while changing the number of topics the plurality of incidents and knowledge elements should be grouped into until the best possible result is achieved on the validation set incident-knowledge pairs. That is, prediction engine 425 may use the validation set to evaluate the grouping. Since the incident-knowledge pairs in the validation may be are known to have good coverage, for each incident-knowledge pair, it is known that the information included in the knowledge element was used to resolve the corresponding incident. This indicates that the text in the reference-target fields of the pair may be similar, and therefore, an accurately built unsupervised model would assign both the incident and knowledge element to the same topic. Thus, when optimizing the number of topics, prediction engine 425 may enable a user to determine whether, for each incident-knowledge pair in the validation set, the incident and knowledge element of the pair were assigned to the same topic from among the plurality of topics and both the incident and the knowledge element of the pair fitted well into the corresponding topic (i.e., high model fit value). When prediction engine 425 determines that the validation set incident-knowledge pair topic assignments are accurate for at least a predetermined percentage (e.g., 60%) of the total number of incident-knowledge pairs (i.e., fingerprints) included in the validation set (predetermined threshold), prediction engine 425 may present data that indicates (or may automatically determine) to a user that the plurality of topics accurately represent and group the plurality of incidents and knowledge elements of client instance 410. In one embodiment, at block 530 despite the iterative process, if the performance accuracy of the topic modelling on the validation set does not rise above the predetermined threshold, prediction engine 425 may present data that indicates (or may automatically determine) that an accurate unsupervised machine learning model cannot be built.

At block 535, prediction engine 425 may determine model fitting of each of the plurality of incidents and knowledge elements into the plurality of topics. That is, prediction engine 425 may determine how well each of the plurality of incidents and knowledge elements fit into every topic and calculates a model fit value for every topic. The model fit value indicates how well or how poorly a particular incident or knowledge element (i.e., text data of reference or target fields) fits into a particular topic based on text similarity. For each incident and each knowledge element, prediction engine 425 may assign the incident or knowledge element to that topic where the incident or knowledge element has the highest model fit value. Thus, prediction engine 425 may project each incident or knowledge element to its highest fitting topic and the determined model fit value of the incident or knowledge element represents how well the incident or knowledge element fits into its best fitting topic.

FIG. 7 illustrates artifact 700 showing data associated with the plurality of incidents in accordance with one or more disclosed embodiments. As shown in FIG. 7, zero, one or more fingerprints of different types (e.g., attach type, intermediate attach type, intermediate KB ref type, KB ref type, high text similarity type) may be associated with each of a plurality of incidents. Further, when prediction engine 425 uses unsupervised machine learning, prediction engine 425 determines using topic modelling, for each incident, a model fit value for the incident's best fitting topic. Similarly, FIG. 8 illustrates artifact 800 showing data associated with the plurality of knowledge elements in accordance with one or more disclosed embodiments. As shown in FIG. 8, zero, one or more fingerprints of different types (e.g., attach type, intermediate attach type, intermediate KB ref type, high text similarity type) may be associated with each of a plurality of knowledge elements. Further, when prediction engine 425 uses unsupervised machine learning, prediction engine 425 determines, using topic modelling, for each knowledge element, a model fit value for the knowledge element's best fitting topic.

At block 540, for each incident and knowledge element, prediction engine 425 may utilize the model fit value, corresponding fingerprint data of zero, one or more fingerprints, and information regarding the number of corresponding incidents or knowledge elements included in the corresponding best fitting topic to determine a coverage confidence value indicating confidence in whether or not the corresponding incident or knowledge element has good quality coverage (higher than a threshold value) (higher the value, higher the confidence of good coverage). As shown in FIGS. 7 and 8, the coverage confidence value is determined for each incident and each knowledge element. At block 545, for each incident and each knowledge element, prediction engine 425 may predict an incident class (e.g., 'good coverage', 'need knowledge', 'one-offs') or knowledge element class (e.g., 'good coverage', 'revise', 'retire') based on the determined coverage confidence value. For example, as shown in FIG. 7, since incident 'INC1243' has multiple fingerprints of different types (i.e., intermediate attach type, intermediate KB ref type, KB ref type, and high text similarity type) and since the model fit value of the incident is reasonably high (0.59278), prediction engine 425 may determine a very high coverage confidence value (0.98246). As a result, prediction engine 425 may predict that incident 'INC1243' has good coverage and therefore, belongs to an incident class for 'good coverage'. Further, as shown in FIG. 7, incident 'INC1241' has no associated fingerprint data (and therefore is not part of the validation set). However, incident 'INC1241' has a high model fit value (0.89273) indicating that incident 'INC1241' fits well into its corresponding best fitting topic. Therefore, if prediction engine 425 determines that the topic corresponding to incident 'INC1241' has one or more knowledge elements that fit well into the topic, prediction engine 425 may determine the confidence coverage value (0.81028) of incident 'INC1241' to be higher than the threshold value for the 'good coverage' incident class and thus predict that incident 'INC1241' has good coverage. On the other hand, incident 'INC12139' also does not have associated fingerprint data. But since incident 'INC12139' does not fit well into corresponding best fitting topic (model fit value 0.49272), prediction engine 425 may determine the confidence coverage value (0.69027) to be lower than the threshold value for the 'good coverage' incident class and thus predict that incident 'INC12139' does not have good coverage (i.e., may predict that incident 'INC12139' belongs to the 'need knowledge' incident class). Similarly, when an incident has no corresponding fingerprint data and fits very poorly into its corresponding best topic, prediction engine 425 may determine that the incident belongs to the 'one-off' incident class.

Similarly, as shown in FIG. 8, when a knowledge element is included in the validation set, prediction engine 425 may determine the coverage confidence value of the knowledge element (e.g., 'KB1234', 'KB1235', and the like) to be higher than a corresponding threshold value for the 'good coverage' knowledge element class and thus predict that the knowledge element provides good coverage. Further, as shown in FIG. 8, knowledge element 'KB1241' does not have associated fingerprint data and is not part of the validation set. However, knowledge element 'KB1241' has a high model fit value (0.89273) indicating that knowledge element 'KB1241' fits well into its corresponding best fitting topic. Therefore, if prediction engine 425 determines that the topic corresponding to knowledge element 'KB1241' has one or more incidents that fit well into the topic, prediction engine 425 may determine the confidence coverage value (0.71028) of knowledge element 'KB1241' to be higher than the threshold value for the 'good coverage' knowledge element class and thus predict that knowledge element 'KB1241' provides good coverage.

On the other hand, knowledge element 'KB1239' also does not have associated fingerprint data. But since knowledge element 'KB1239' does not fit that highly into corresponding topic (model fit value 0.49272), prediction engine 425 may determine the confidence coverage value (0.69027) to be lower than the threshold value for the 'good coverage' knowledge element class and thus predict that knowledge element 'KB1239' does not have good coverage (i.e., may predict that knowledge element 'KB1239' belongs to the 'revise' knowledge element class). Similarly, when a knowledge element has no corresponding fingerprint data and fits very poorly into its corresponding best topic, prediction engine 425 may determine that the knowledge element belongs to the 'retire' knowledge element class. The number of incident and knowledge element classes into which prediction engine 425 may classify the data is not limited to three and may be two classes or four or more classes (with corresponding threshold values).

Figure 9:
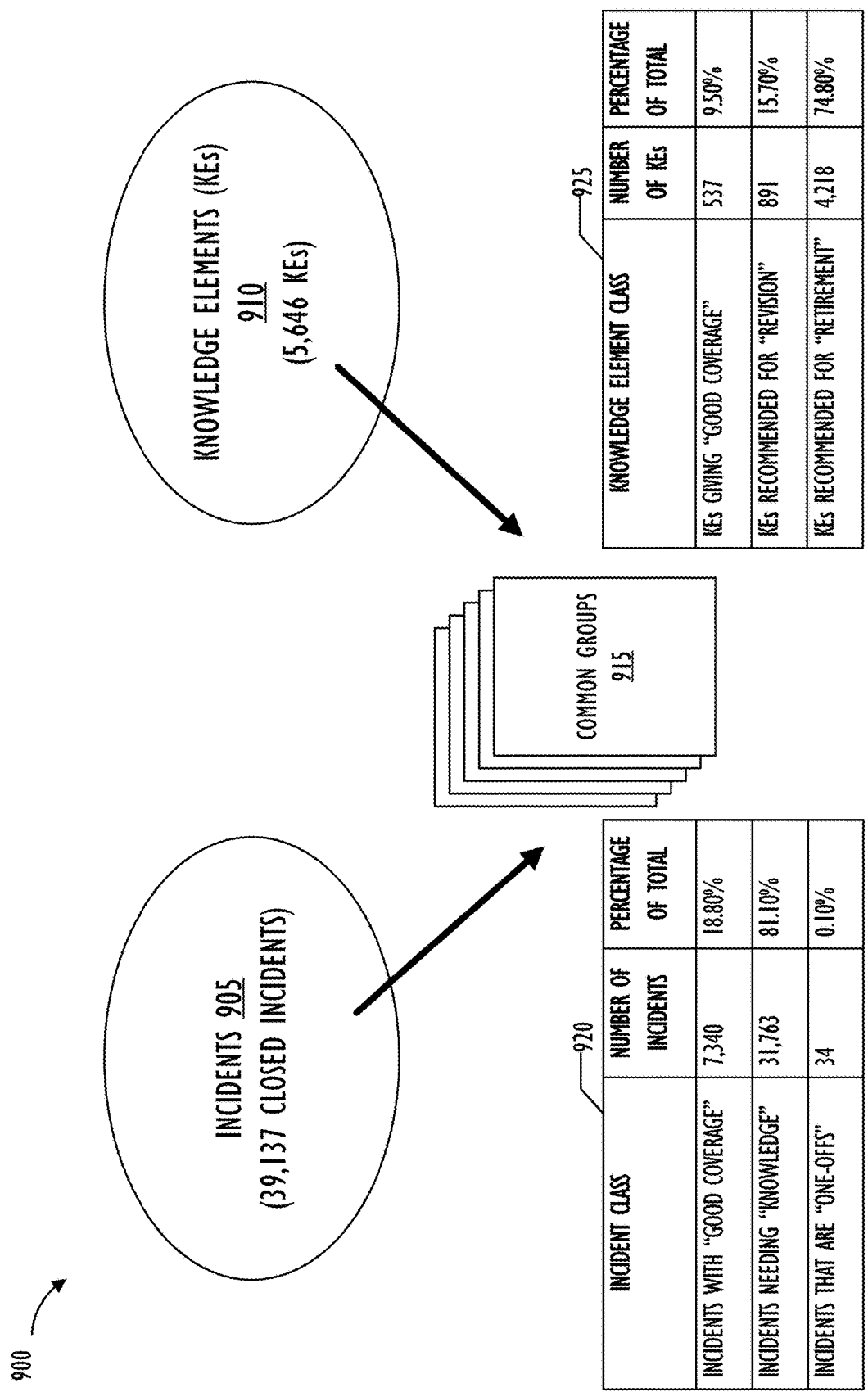
FIG. 9 shows snapshot 900 of an exemplary report generated based on operation of flowchart 500 of FIG. 5 in accordance with one or more embodiments.

At block 550, visualization engine 430 may visualize classification data of the predicted classes for each of the plurality of incidents and knowledge elements and present the classification data to a user with other client instance 410 data. FIG. 9 shows snapshot 900 of an exemplary report for client instance 410 generated based on operation of flowchart 500 of FIG. 5 in accordance with one or more embodiments. As shown in FIG. 9, incidents 905 and knowledge elements 910 of client instance 410 that are extracted at block 505 of FIG. 5 may be counted and a count of the number of incidents 905 and knowledge elements 910 may be presented to the user. Further, incidents 905 and knowledge elements 910 may be grouped into a plurality of common groups 915 (topics) based on topic modelling when prediction engine 425 builds unsupervised machine learning model to classify the incidents and knowledge elements.

As illustrated in the exemplary snapshot 900, prediction engine 425 may predict incident class for each of the 39,137 closed incidents and the knowledge element class for each of the 5,646 knowledge elements. Visualization engine 430 may then present overall classification data of the incident classes and knowledge element classes of incidents 905 and knowledge elements 910 (including or excluding validation set data) in tables 920 and 925 to a user with other client instance 410 data. At block 550, visualization engine 430 may also present the classification data of the plurality of incidents and knowledge elements on a per-topic basis. This may enable the user to determine how well knowledge elements in KB 440 are doing on a per-topic basis, which topics have incidents that need additional knowledge elements, which topics have knowledge elements that provide good coverage, which topics include knowledge elements that are recommended for revision or retirement, the number of knowledge elements for a particular topic, and the like. Based on the classification data presented in snapshot 900, the user may determine at block 555, to perform (or KM module 415 may recommend) a service management operation (e.g., revise, retire knowledge elements from KB 440, create new knowledge elements, and the like) to improve the effectiveness of KB 440. Creating new knowledge elements for KB 440 may be a very manual process of a subject matter expert typing in solutions to issues, and may be very resource intensive. By performing operations described in flowchart 500 of FIG. 5, the enterprise associated with client instance 410 may be able to accurately determine which type of knowledge elements to create and whether exiting knowledge elements are effective in resolving issues in different categories, thereby ensuring return on investment in creating content for KB 440.

Returning to FIG. 5, when prediction engine 425 determines that the validation set meets predetermined conditions (YES at block 525), operation proceeds to block 560. At block 560, since there is enough training data in the validation set, prediction engine 425 builds a supervised machine learning model and feeds into the model, the validation set data which acts as a training set of data for supervised machine learning and includes known features (e.g., incident and knowledge element data in validation set) and known responses (e.g., corresponding known incident or knowledge element class (high, medium or low threshold value)) used to train, validate and test the supervised machine learning model that is then deployed to make predictions on the extracted data of closed incidents and knowledge elements of KB 440 that are not part of the validation set. In one embodiment, the supervised machine learning model may be a neural network, gradient boosted decision tree or a logistic progression model. At block 560, prediction engine 425 may be trained as the supervised machine learning model using the training set on each of the plurality of incident and/or knowledge element classes, and then the built model may be deployed to predict an incident class (e.g., 'good coverage', 'need knowledge', 'one-offs') or knowledge element class (e.g., 'good coverage', 'revise', 'retire') for each of the remaining incidents and knowledge elements that are not included in the validation (training) set (block 565). At block 570, visualization engine 430 may visualize classification data of the predicted classes for each of the plurality of incidents and knowledge elements and present the classification data to a user along with other client instance 410 data. Operation at block 570 may be similar to that at block 550.

Figure 10:
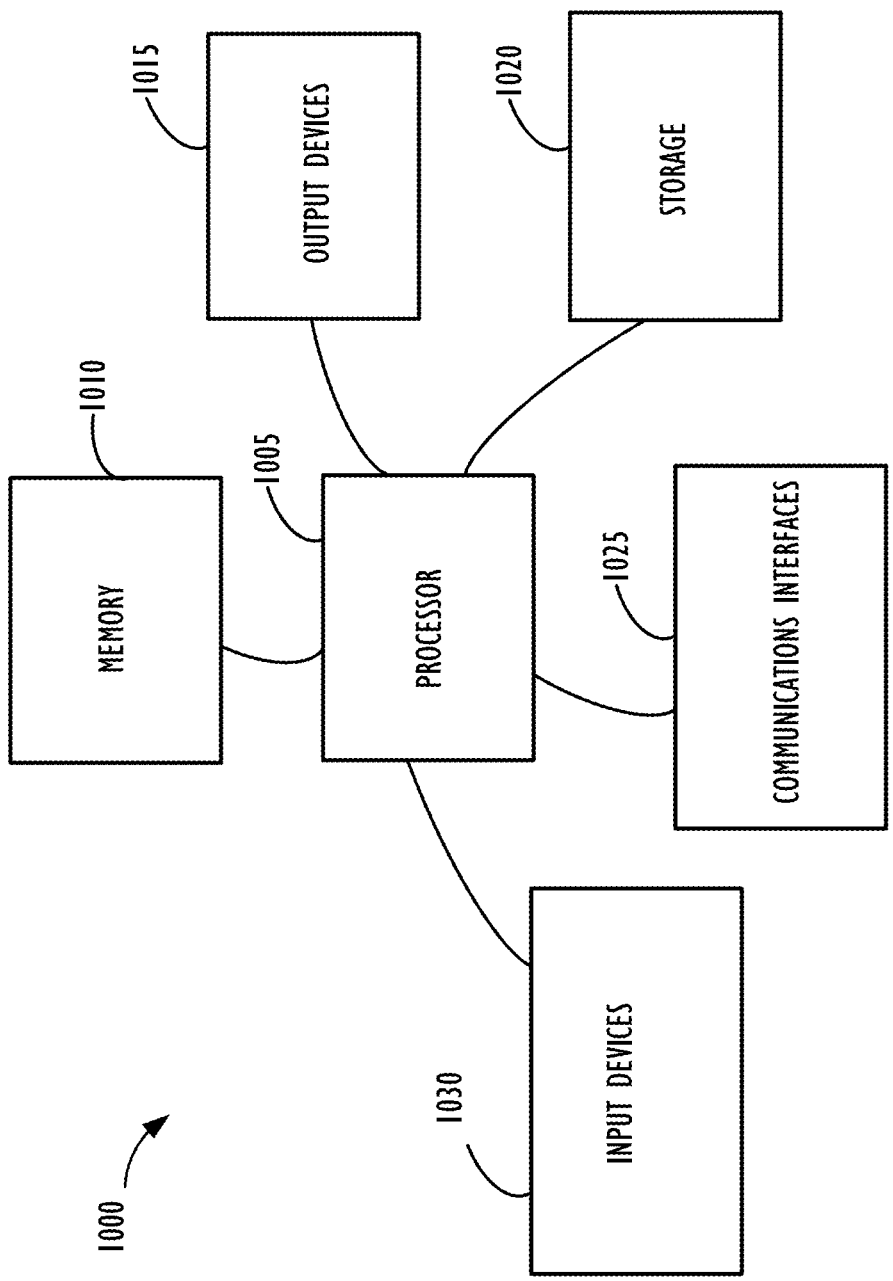
FIG. 10 illustrates a high-level block diagram 1000 of a processing device (computing system) that may be used to implement one or more disclosed embodiments.

FIG. 10 illustrates a high-level block diagram 1000 of a processing device (computing system) that may be used to implement one or more disclosed embodiments (e.g., data server computers 110, client computers 115, cloud resources platform/network 210, client devices 204A-204E, client instance 308, server instances 214, data centers 306A-306B, remote client device 405, client instance 410, etc.). For example, computing device 1000 illustrated in FIG. 10 could represent a client device or a physical server device and include either hardware or virtual processor(s) depending on the level of abstraction of the computing device. In some instances (without abstraction) computing device 1000 and its elements as shown in FIG. 10 each relate to physical hardware and in some instances one, more, or all of the elements could be implemented using emulators or virtual machines as levels of abstraction. In any case, no matter how many levels of abstraction away from the physical hardware, computing device 1000 at its lowest level may be implemented on physical hardware. As also shown in FIG. 10, computing device 1000 may include one or more input devices 1030, such as a keyboard, mouse, touchpad, or sensor readout (e.g., biometric scanner) and one or more output devices 1015, such as displays, speakers for audio, or printers. Some devices may be configured as input/output devices also (e.g., a network interface or touchscreen display). Computing device 1000 may also include communications interfaces 1025, such as a network communication unit that could include a wired communication component and/or a wireless communications component, which may be communicatively coupled to processor 1005. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 10, processing device 1000 includes a processing element such as processor 1005 that contains one or more hardware processors, where each hardware processor may have a single or multiple processor cores. In one embodiment, the processor 1005 may include at least one shared cache that stores data (e.g., computing instructions) that are utilized by one or more other components of processor 1005. For example, the shared cache may be a locally cached data stored in a memory for faster access by components of the processing elements that make up processor 1005. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) or a microprocessor. Although not illustrated in FIG. 10, the processing elements that make up processor 1005 may also include one or more other types of hardware processing components, such as graphics processing units (GPUs), application specific integrated circuits (ASICs), field-programmable gate arrays (FPGAs), and/or digital signal processors (DSPs).

FIG. 10 illustrates that memory 1010 may be operatively and communicatively coupled to processor 1005. Memory 1010 may be a non-transitory medium configured to store various types of data. For example, memory 1010 may include one or more volatile devices such as random access memory (RAM). Non-volatile storage devices 1020 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 1020 may be used to store overflow data if allocated RAM is not large enough to hold all working data. The non-volatile storage devices 1020 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1005. In one embodiment, the compiling process of the software program may transform program code written in a programming language to another computer language such that the processor 1005 is able to execute the programming code. For example, the compiling process of the software program may generate an executable program that provides encoded instructions (e.g., machine code instructions) for processor 1005 to accomplish specific, non-generic, particular computing functions.

After the compiling process, the encoded instructions may then be loaded as computer executable instructions or process steps to processor 1005 from storage 1020, from memory 1010, and/or embedded within processor 1005 (e.g., via a cache or on-board ROM). Processor 1005 may be configured to execute the stored instructions or process steps in order to perform instructions or process steps to transform the computing device into a non-generic, particular, specially programmed machine or apparatus. Stored data, e.g., data stored by a storage device 1020, may be accessed by processor 1005 during the execution of computer executable instructions or process steps to instruct one or more components within the computing device 1000.

A user interface (e.g., output devices 1015 and input devices 1030) can include a display, positional input device (such as a mouse, touchpad, touchscreen, or the like), keyboard, or other forms of user input and output devices. The user interface components may be communicatively coupled to processor 1005. When the output device is or includes a display, the display can be implemented in various ways, including by a liquid crystal display (LCD) or a cathode-ray tube (CRT) or light emitting diode (LED) display, such as an organic LED (OLED) display. Persons of ordinary skill in the art are aware that the computing device 1000 may comprise other components well known in the art, such as sensors, powers sources, and/or analog-to-digital converters, not explicitly shown in FIG. 10.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A system comprising:
a non-transitory memory; and
one or more hardware processors configured to execute instructions from the non-transitory memory to:
   obtain client instance data including a plurality of incidents and a plurality of knowledge elements comprising information relating to resolving one or more of the plurality of incidents;
   build a validation set based on the obtained client instance data, wherein the validation set comprises fingerprint data of a plurality of fingerprints of known incident-knowledge relationships, each of the plurality of fingerprints representing a link between one of the plurality of incidents and one of the plurality of knowledge elements used for resolving the incident;
   train a prediction engine using machine learning to classify, based on the plurality of fingerprints, the plurality of knowledge elements into a plurality of knowledge element classes, wherein the plurality of knowledge element classes are defined based on respective threshold values, wherein each of the respective threshold values indicates a quality of coverage provided by a respective knowledge element class for resolving an incident;
   predict, via the trained prediction engine, a knowledge element class from among the plurality of knowledge element classes for each of the plurality of knowledge elements based on the built validation set; and
   present classification data of the plurality of knowledge elements classified into the plurality of knowledge element classes with the obtained client instance data.

2. The system of claim 1, wherein training the prediction engine comprises using unsupervised machine learning to train the prediction engine to respectively fit the plurality of incidents and the plurality of knowledge elements into a plurality of common groups, a number of the plurality of common groups being optimized based on the fingerprint data of the plurality of fingerprints included in the validation set, and
wherein, for each of the plurality of knowledge elements, the one or more hardware processors are configured to execute instructions from the non-transitory memory to:
   determine a model fit value indicating how well the knowledge element fits into a corresponding common group;
   determine a coverage confidence value based on a number of incidents in the corresponding common group, the determined model fit value, and fingerprint data associated with the knowledge element, wherein the prediction engine predicts the knowledge element class of the knowledge element based on the determined coverage confidence value of the knowledge element; and present the plurality of common groups representing the plurality of incidents and the plurality of knowledge elements in respective association with each other.

3. The system of claim 2, wherein, for each of the plurality of incidents, the one or more hardware processors are configured to execute instructions from the non-transitory memory to:

determine a model fit value indicating how well the incident fits into a corresponding common group;

determine a coverage confidence value based on a number of knowledge elements in the corresponding common group, the determined model fit value, and fingerprint data associated with the incident;

predict an incident class from among a plurality of incident classes for the incident based on the determined coverage confidence value of the incident, wherein the incident class is predicted using the prediction engine that is trained to classify the plurality of incidents into the plurality of incident classes, the plurality of incident classes being defined based on respective threshold values indicating a quality of knowledge coverage available for the incident; and present classification data of the plurality of incidents classified into the plurality of incident classes with the obtained client instance data.

4. The system of claim 1, wherein training the prediction engine comprises using supervised machine learning to train the prediction engine to classify the plurality of knowledge elements into the plurality of knowledge element classes based on the fingerprint data of the plurality of fingerprints included in the validation set, the fingerprint data of the plurality of fingerprints representing training data for training the prediction engine on each of the plurality of knowledge element classes.

5. The system of claim 4, wherein training the prediction engine comprises using supervised machine learning to train the prediction engine to classify the plurality of incidents into a plurality of incident classes based on the fingerprint data of the plurality of fingerprints included in the validation set, the fingerprint data of the plurality of fingerprints representing training data for training the prediction engine on each of the plurality of incident classes.

6. The system of claim 1, wherein the plurality of fingerprints are based on a plurality of fingerprint types including an attachment fingerprint type that indicates a relationship between a given knowledge element and a given incident based on one or more table joins indicating a formal relationship between the given knowledge element and the given incident.

7. The system of claim 1, wherein the plurality of fingerprints are based on a plurality of fingerprint types including a text similarity fingerprint type that indicates a relationship between a given knowledge element and a given incident based on at least one of: (i) text similarity between at least a portion of a predetermined field of the given incident and at least a portion of a predetermined field of the given knowledge element; and (ii) text similarity between at least the portion of the predetermined field of the given incident and at least a portion of a first predetermined field of an intermediate entity, and text similarity between at least a portion of a second predetermined field of the intermediate entity and at least the portion of the predetermined field of the given knowledge element.

8. The system of claim 1, wherein the plurality of fingerprints are based on a plurality of fingerprint types including a reference fingerprint type that indicates a relationship between a given knowledge element and a given incident based on at least one of presence of reference information of the given knowledge element in a predetermined field of the given incident, and presence of the reference information of the given knowledge element in an intermediate field of an intermediate entity associated with the given incident.

9. The system of claim 1, wherein the plurality of incidents are closed incidents that have been resolved.

10. The system of claim 1, wherein each fingerprint of the plurality of fingerprints in the validation set comprises a known incident-knowledge relationship different from other fingerprints of the plurality of fingerprints.

11. The system of claim 10, wherein a fingerprint of the plurality of fingerprints in the validation set is selected from a plurality of available fingerprints for a same incident based on a predetermined condition.

12. A non-transitory computer-readable recording medium having stored thereon a program, the recording medium comprising instructions that when executed by one or more processing units cause the one or more processing units to:

obtain client instance data including a plurality of incidents and a plurality of knowledge elements comprising information relating to resolving one or more of the plurality of incidents;

build a validation set based on the obtained client instance data, wherein the validation set comprises fingerprint data of a plurality of fingerprints of known incident-knowledge relationships, each of the plurality of fingerprints representing a link between one of the plurality of incidents and one of the plurality of knowledge elements used for resolving the incident;

train a prediction engine using machine learning to classify, based on the plurality of fingerprints, the plurality of knowledge elements into a plurality of knowledge element classes, wherein the plurality of knowledge element classes are defined based on respective threshold values, wherein each of the respective threshold values indicates a quality of coverage provided by a respective knowledge element class for resolving an incident;

predict, via the trained prediction engine, a knowledge element class from among the plurality of knowledge element classes for each of the plurality of knowledge elements based on the built validation set; and present classification data of the plurality of knowledge elements classified into the plurality of knowledge element classes with the obtained client instance data.

13. The non-transitory computer-readable recording medium of claim 12, wherein training the prediction engine comprises using unsupervised machine learning to train the prediction engine to respectively fit the plurality of incidents and the plurality of knowledge elements into a plurality of common groups, a number of the plurality of common groups being optimized based on the fingerprint data of the plurality of fingerprints included in the validation set, and wherein the recording medium comprises instructions that when executed by one or more processing units cause the one or more processing units, for each of the plurality of knowledge elements, to:

determine a model fit value indicating how well the knowledge element fits into a corresponding common group;

determine a coverage confidence value based on a number of incidents in the corresponding common group, the determined model fit value, and fingerprint data associated with the knowledge element, wherein the prediction engine predicts the knowledge element class of the knowledge element based on the determined coverage confidence value of the knowledge element; and present the plurality of common groups representing the plurality of incidents and the plurality of knowledge elements in respective association with each other.

14. The non-transitory computer-readable recording medium of claim 13, wherein the recording medium comprises instructions that when executed by one or more processing units cause the one or more processing units, for each of the plurality of incidents, to:

determine a model fit value indicating how well the incident fits into a corresponding common group;

determine a coverage confidence value based on a number of knowledge elements in the corresponding common group, the determined model fit value, and fingerprint data associated with the incident;

predict an incident class from among a plurality of incident classes for the incident based on the determined coverage confidence value of the incident, wherein the incident class is predicted using the prediction engine that is trained to classify the plurality of incidents into the plurality of incident classes, the plurality of incident classes being defined based on respective threshold values indicating a quality of knowledge coverage available for the incident; and present classification data of the plurality of incidents classified into the plurality of incident classes with the obtained client instance data.

15. The non-transitory computer-readable recording medium of claim 12, wherein training the prediction engine comprises using supervised machine learning to train the prediction engine to classify the plurality of knowledge elements into the plurality of knowledge element classes based on the fingerprint data of the plurality of fingerprints included in the validation set, the fingerprint data of the plurality of fingerprints representing training data for training the prediction engine on each of the plurality of knowledge element classes.

16. The non-transitory computer-readable recording medium of claim 15, wherein training the prediction engine comprises using supervised machine learning to train the prediction engine to classify the plurality of incidents into a plurality of incident classes based on the fingerprint data of the plurality of fingerprints included in the validation set, the fingerprint data of the plurality of fingerprints representing training data for training the prediction engine on each of the plurality of incident classes.

17. The non-transitory computer-readable recording medium of claim 12, wherein the plurality of fingerprints are based on a plurality of fingerprint types including an attachment fingerprint type that indicates a relationship between a given knowledge element and a given incident based on one or more table joins indicating a formal relationship between the given knowledge element and the given incident.

18. The non-transitory computer-readable recording medium of claim 12, wherein the plurality of fingerprints are based on a plurality of fingerprint types including a text similarity fingerprint type that indicates a relationship between a given knowledge element and a given incident based on at least one of: (i) text similarity between at least a portion of a predetermined field of the given incident and at least a portion of a predetermined field of the given knowledge element; and (ii) text similarity between at least the portion of the predetermined field of the given incident and at least a portion of a first predetermined field of an intermediate entity, and text similarity between at least a portion of a second predetermined field of the intermediate entity and at least the portion of the predetermined field of the given knowledge element.

19. The non-transitory computer-readable recording medium of claim 12, wherein the plurality of fingerprints are based on a plurality of fingerprint types including a reference fingerprint type that indicates a relationship between a given knowledge element and a given incident based on at least one of presence of reference information of the given knowledge element in a predetermined field of the given incident, and presence of the reference information of the given knowledge element in an intermediate field of an intermediate entity associated with the given incident.

20. A method comprising:

obtaining, with one or more processors, client instance data including a plurality of incidents and a plurality of knowledge elements comprising information relating to resolving one or more of the plurality of incidents;

building, with the one or more processors, a validation set based on the obtained client instance data, wherein the validation set comprises fingerprint data of a plurality of fingerprints of known incident-knowledge relationships, each of the plurality of fingerprints representing a link between one of the plurality of incidents and one of the plurality of knowledge elements used for resolving the incident;

training a prediction engine using machine learning to classify, based on the plurality of fingerprints, the plurality of knowledge elements into a plurality of knowledge element classes, wherein the plurality of knowledge element classes are defined based on respective threshold values, wherein each of the respective threshold values indicates a quality of coverage provided by a respective knowledge element class for resolving an incident;

predicting, with the one or more processors and via the trained prediction engine, a knowledge element class from among the plurality of knowledge element classes for each of the plurality of knowledge elements based on the built validation set; and presenting, with the one or more processors, classification data of the plurality of knowledge elements classified into the plurality of knowledge element classes with the obtained client instance data.

* * * * *